J. M. INGRAHAM.
Coffee Pot.
No. 19,780. Patented March 30, 1858.
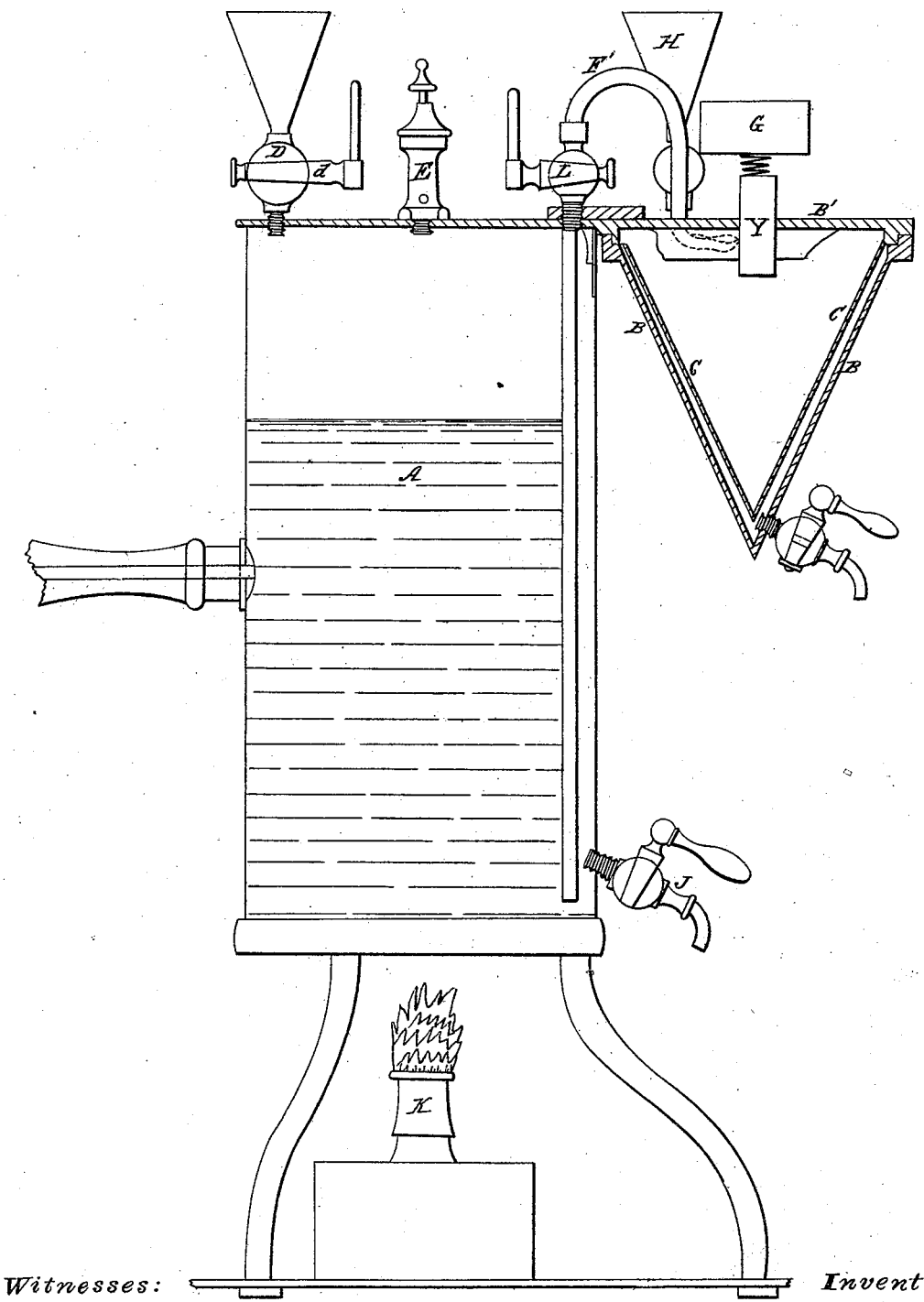
Witnesses:
Inventor

UNITED STATES PATENT OFFICE.

JAS. M. INGRAHAM, OF NEW YORK, N. Y.

COFFEE AND TEA POT.

Specification of Letters Patent No. 19,780, dated March 30, 1858.

*To all whom it may concern:*

Be it known that I, JAMES M. INGRAHAM, of the city, county, and State of New York, have invented and made certain novel and useful Improvements in Coffee and Tea Pots of Urns; and I do hereby declare the following to be a full, clear, and exact description thereof, reference being had to the accompanying drawings, which constitute a part of this my specification.

Plate 1 is a vertical section of my apparatus for making tea, coffee, chocolate or any similar decoction.

A is a steam tight cylinder or chamber of any convenient size and shape for holding hot water, which is kept heated by means of the lamp K or otherwise, and is drawn off by the waste cock J. This chamber is supplied through the tunnel shaped pipe D, which has a stop cock $d$. E is a safety valve opening into this steam chamber.

B is a stationary plate or cover fastened horizontally to the outer edge of the top of this steam chamber as represented.

B B is an inverted conical chamber (which I call the pot); it is steam tight and contains a filterer $c, c$, of corresponding shape but of such a size as to admit of a small space $n, n$, between it and the coffee pot in which it is placed. Into this filterer the coffee or other material is placed for steeping. Around the apex of the filterer extending half way up are small perforations of the size usual in coffee strainers. The filterer being fitted into the pot B B, the whole is secured under the plate or cover B' (to which it is made to fit steam tight) by means of a set screw G and a clamp Y, thus forming within a complete steam tight chamber.

H is a funnel shaped pipe through which the coffee or other material for steeping is supplied to the filterer; and it is opened and closed by means of a stop cock, not represented in the drawing, similar to D but this pipe is not essential.

F F is a siphon which carries the hot water from the water chamber to the filterer; this is the only communication between the two chambers, and this may be cut off by means of the stop L. This siphon is continued in a curve under the plate with its opening toward the center of the plate, so that when the water presses out it strikes the plate about the center, and is thus distributed or scattered over the surface of the coffee: It is represented at $x$ $x$.

I is a faucet for drawing off the decoction when ready for use.

The operation of this contrivance is as follows: The water chamber having been partially filled with boiling water (kept boiling by the lamp K or otherwise) the space above the water becomes filled with steam, which pressing upon the surface forces the boiling water into the siphon F. The cock L being now opened the water passes through it into the filterer which has previously been charged with the required quantity of coffee or other material. The scalding water percolates through the material and finally reaches the bottom. It then passes out through the perforations around the apex and there collects between the filterer and the pot ready for use of a quality proportioned to the quantity of material which has been used and the quantity of water which has been let on through the stop L.

The superiority of this arrangement over others is: First, by making the decoction in a steam tight chamber, I save all the aromatic and volatile particles which would otherwise pass off with the steam; thereby securing a better flavor and strength from the same quantity and quality of material than by any other process. Second, by separating the conical pot from the heater, I avoid all risk of scorching or burning the decoction while making it or after it is made. Third, the conical shape of the pot and filter serves to insure the wetting of all the coffee or other material to be steeped and to catch the grounds or dregs as the liquid runs to the apex and passes out through the perforations. Fourth, the cock L, being closed the decoction left in the pot will remain good for several days, as the air cannot reach it to spoil it.

Now what I claim as new and useful and desire to secure by Letters Patent, is:

I claim the steam tight coffee pot, the filterer C with the conical chamber B B, and the siphon combined, arranged and operating in the manner and for the purpose substantially as described.

In testimony whereof I have hereto set my hand this eighteenth day of March eighteen hundred and fifty eight.

J. M. INGRAHAM.

In presence of—
JOHN O'DONNELL,
ROBERT G. PIKE.